United States Patent
Swift et al.

(10) Patent No.: US 6,508,284 B1
(45) Date of Patent: Jan. 21, 2003

(54) FORMING AND MOUNTING OF AN ASYMMETRIC RACE TIRE

(75) Inventors: Douglas Ashley Swift, Hudson, OH (US); John Gregory Stucker, Stow, OH (US); Richard Barkley Campbell, Massillon, OH (US); Charles Kenneth Schmalix, Canal Fulton, OH (US); Joel Joseph Lazeration, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/674,568
(22) PCT Filed: May 11, 1998
(86) PCT No.: PCT/US98/09536
§ 371 (c)(1),
(2), (4) Date: Oct. 27, 2000
(87) PCT Pub. No.: WO99/58349
PCT Pub. Date: Nov. 18, 1999

(51) Int. Cl.⁷ .............................. B60C 3/06; B60C 11/01
(52) U.S. Cl. .................... 152/456; 152/209.8; 152/454; 152/455
(58) Field of Search .............................. 152/209.8, 455, 152/456, 454

(56) References Cited

U.S. PATENT DOCUMENTS 3,435,874 A  4/1969  Mirtain et al. .............. 152/352
5,591,282 A  1/1997  Weber et al. ................ 152/456
5,620,538 A  4/1997  Oshima ................... 152/209 A
5,971,048 A  * 10/1999  Ashmore ................. 152/209.1

FOREIGN PATENT DOCUMENTS

| CA | 810955 | * | 4/1969 | |
| EP | 0 755 808 A | | 1/1997 | ............. B60C/3/06 |
| EP | 0 820 884 A | | 1/1998 | ............. B60C/3/06 |
| GB | 2 205 283 A | | 12/1988 | ............. B60C/3/06 |
| JP | 61282102 | * | 12/1986 | |

* cited by examiner

Primary Examiner—Michael W. Ball
Assistant Examiner—Justin Fischer
(74) Attorney, Agent, or Firm—Nancy T. Krawczyk

(57) ABSTRACT

The loss of tire contact patch area along the tire's inside shoulder, relative to an oval race course, which occurs during chassis roll and lateral deflection, is reduced by providing an asymmetrical molded tire. The tires are defined by an asymmetrical outer tread profile and the tires are mounted on the rear axle of the race vehicle such that the axially outer portion of the asymmetrical tread region of each tire, relative to the race course, has a greater shoulder drop, wherein the shoulder drop is the difference between the maximum radial diameter of the tread measured on the outer tread contour and the diameter of the tread at the tread edge, than the opposing tire shoulder.

3 Claims, 3 Drawing Sheets

FORMING AND MOUNTING OF AN ASYMMETRIC RACE TIRE

TECHNICAL FIELD

This invention relates generally to a tire for use on a vehicle with suspension systems allowing little or no camber adjustment. More particularly, the invention relates to a racing tire with improved lateral force characteristics for use on solid rear axle race cars.

BACKGROUND ART

Laboratory studies have shown that a majority of a tire's net cornering force is generated in the area of the shoulder on the inside of the direction of turn. Roll and lateral deflection to the outside tend to lift this inside shoulder, reducing the tire's cornering capability. In many vehicles, especially high performance or racing vehicles, the vehicle's suspension system compensates for the reduced cornering capability by cambering of the vehicle wheels. In cambering, the top of a wheel and tire are tilted toward the center of the radius of the turn for maximum cornering force.

For racing vehicles participating in NASCAR racing, such as in the Winston Cup and Busch Series'Grand National Division, cambering of the tire tilts the top of the tire and wheel inward toward the center of the oval track. The effect of such cambering on the contact patch of the tire as it travels about the track is such that on straight-aways the contact patch is eggshaped with the larger radius toward the inside of the track. This contact patch becomes more oval shaped while cornering, due to the effect of the roll and lateral deflection. This oval shaped contact patch is desirable as it enables a more even distribution of the forces across the tread during cornering, and provides for more stabile high speed cornering.

However, for NASCAR vehicles, the appropriate sanctioning bodies forbid or limit the cambering on the rear axle, thus there is no offsetting of the roll and lateral deflection during cornering. Due to the lack of camber, when the rear axle race tire undergoes significant lateral forces during high speed cornering the contact patch configuration becomes egg-shaped with the larger radius toward the outside of the turn. This results in a loss of tire contact patch area along the tire's inside shoulder, relative to the turn, and reduced cornering stability for the vehicle.

The off-cambered half of a tire effectively requires less drop than the on-cambered side to support a given load. A tire's shoulder drop and profile determine its relationship between load, camber, and footprint. Prior art tires designed to compensate for reduced camber preset have employed asymmetric shaped tires with unequal length sidewalls. The tires did not specifically alter the load/footprint relationship along the off-cambered shoulder.

U.S. Pat. No. 3,435,874 discloses varying the tread profile or the belt profile to achieve a desired offset of the force of structure and the force of conicity to result in a low total lateral slip force. The tread profile may be inclined at a single angle from one tread edge to the opposing tread edge, or differing angles.

U.S. Pat. No. 5,591,282 discloses a tire and vehicle system configured to compensate for the lack of camber on the rear axle of a vehicle. Therein, a support member is placed on the surface of the tire's inboard sidewall. However, such a system adds weight to the tire, an undesirable result for a racing tire, where optimized weight reduction is required.

U.S. Pat. No. 5,620,538 discloses an asymmetrical racing tire for use on an oval race course. The tire is design for reduced belt edge separation on the outer sides of the tire, relative to the mounted wheel. The asymmetric tire has an outer diameter and thickness at the outer tread region greater than the outer diameter and thickness at the inner tread region. Again, such a tire has increased weight without compensating for the lack of camber on the rear axle of the vehicle.

European Patent 755 808A2 discloses a tire for a passenger vehicle wherein the tire has a sloped tread profile wherein the shoulder drops are unequal and the maximum tire height is offset from the tire centerline. When the tire is mounted on a vehicle, the shoulder with the greatest shoulder drop is to be mounted away from the vehicle body.

SUMMARY OF THE INVENTION

The present invention discloses a method of improving the lateral force characteristics of rear axle racing tires by eliminating the loss of the tire contact patch area along the tire's inside shoulder, relative to the cornering of the vehicle, which occurs during chassis roll and lateral deflection.

In another aspect of the present invention, a tire to be set on the rear axle of a racing vehicle running on a circular race course, is disclosed. The profile of an outer tread region of the tread which is positioned to be further axially outward toward an outer side of a race course than a center line of the tine and a profile of an inner tread region of the tread portion which is positioned to be further axially inward toward an inner side of the race course than the center line of the tire are asymmetrical. The axially outer portion of the asymmetrical tread region of each tire to be mounted on the rear axle of the vehicle, relative to the race course, has a greater shoulder drop, where the shoulder drop is the difference between the maximum radial diameter of the tread measured on the outer tread contour and the diameter of the tread at the tread edge, than the axially inner portion of the asymmetrical tread region.

In further accordance with the disclosed invention, the ratio of the shoulder drop of the axially outer shoulder of each tire mounted on the rear axle of a noncambered vehicle to the shoulder drop of the axially inner shoulder of the ire is equal to 1.0 to 4.5.

In further accordance with the disclosed invention, the ratio of the shoulder drop of the axially outer shoulder of each tire mounted on the rear axle of a non-cambered vehicle to the shoulder drop of the axially inner shoulder of the tire is equal to 1.5 to 2.5.

Another disclosed invention is the method of mounting a tire on a rear axle of a racing vehicle for running on an oval race course. The profile of an outer tread region of tire tread which is position to be further axially outward toward an outer side of a race course than a center line of the tire and a profile of an inner tread region of the tire tread which is positioned to be further axially inward toward an inner side of the race course than the center line of the tire are asymmetrical. The tire is mounted wherein the shoulder drop, the difference between the maximum radial diameter of the tread and the radial diameter of the tread at the tread edge, of the axially outer portion of the tire, relative to the race course, has a greater shoulder drop than the axially inner portion of the tire.

In further accordance with the disclosed method of mounting a tire, the ratio of the axially outer shoulder drop to the axially inner shoulder drop is in the range of 1.0 to 4.5.

In further accordance with the disclosed method of mounting a tire, the ratio of the axially outer shoulder drop to the axially inner shoulder drop is in the range of 1.5 to 2.5.

Another disclosed invention is the method of molding an asymmetric tire by providing a tire, an asymmetrical mold, and molding the tire in the mold. The asymmetrical mold is characterized by a tread profile comprising axially opposing tread shoulder regions, each shoulder region having a maximum radial height of the mold tread profile, and a tread centerline having a minimum radial height of the mold tread profile. Each shoulder region is defined by a shoulder drop height equivalent to difference between the maximum radial height of the shoulder region and the minimum radial height of the tread mold profile at the tread centerline. The shoulder drop height of a first shoulder region is greater than the shoulder drop height of the opposing second shoulder region.

In further accordance with the disclosed method of molding an asymmetric tire the ratio of the shoulder drop of the first shoulder region to shoulder drop of the opposing second shoulder region is in the range of 1.0 to 4.5.

In further accordance with the disclosed method of molding an asymmetric tire the ratio of the shoulder drop of the first shoulder region to shoulder drop of the opposing second shoulder region is in the range of 1.5 to 2.5.

Definitions

"Apex" means an elastomeric filler located radially above the bead core and between the plies and the turnup ply.

"Asymmetric tread" means a tread that has a tread configuration not symmetrical about the centerline CL or equatorial plane EP of the tire.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belts" refers to at least two annular layers or plies of parallel reinforcement cords having the same angle with reference to the equatorial plane of the tire as the parallel reinforcing cords in carcass plies.

"Camber" means the tilt of the front wheels of a vehicle; outward at top is positive.

"Carcass" means the tire structure apart from the belt structure, tread, undertread, and sidewall rubber over the plies, but including the beads.

"Casing" means the carcass, belt structure, beads, sidewalls, and all other components of the tire excepting the tread and undertread.

"Circumferential" means lines or directions extending along the perimeter of the surface of the annular tire parallel to the Equatorial Plane (EP) and perpendicular to the axial direction.

"Equatorial plane (EP)" means the plane perpendicular to the tire's axis of rotation and passing through the center of its tread.

"Groove" means an elongated void area in a tread that may extend circumferentially or laterally about the tread in a straight curved, or zigzag manner.

"Inner Side" of the disclosed invention means the side of the tire closest to the center of an oval race course when the tire is mounted on a vehicle located on the oval race course, and "Outer Side" means the side of the tire closest to the outermost side of an oval race course when the tire is mounted on a vehicle located on the oval race course.

"Lateral Edge" means the axially outermost edge of the tread as defined by a plane parallel to the equatorial plane and intersecting the outer ends of the axially outermost traction lugs at the radial height of the inner tread surface.

"Radial tire" means a belted or circumferentially-restricted pneumatic tire in which the ply cords which extend from bead to bead are laid at cord angles between 65° and 90° with respect to the equatorial plane of the tire.

"Section height" means the radial distance from the nominal rim diameter to the outer diameter of the tire at its equatorial plane.

"Shoulder" means the upper portion of sidewall just below the tread edge, effects cornering. Tread shoulder or shoulder rib means that portion of the tread near the shoulder "Sidewall" means that portion of a tire between the tread and the bead.

"Tread" means a molded rubber component which, when bonded to a tire casing, includes that portion of the tire that comes into contact with the road when the tire is normally inflated and under normal load.

"Tread Centerline"(CL) refers to the intersection of the equatorial plane (EP) with the tread.

"Tread Radius" is the radius or combination of radii describing the tread contour.

"Tread Arc Width" means the arc length of the tread surface in the axial direction, that is, in a plane parallel to the axis of rotation of the tire.

BRIEF DESCRIPTION OF DRAWINGS

The invention will be described by way of example and with reference to the accompanying drawings in which.

DETAILED DESCRIPTION OF THE INVENTION

Figure 1:
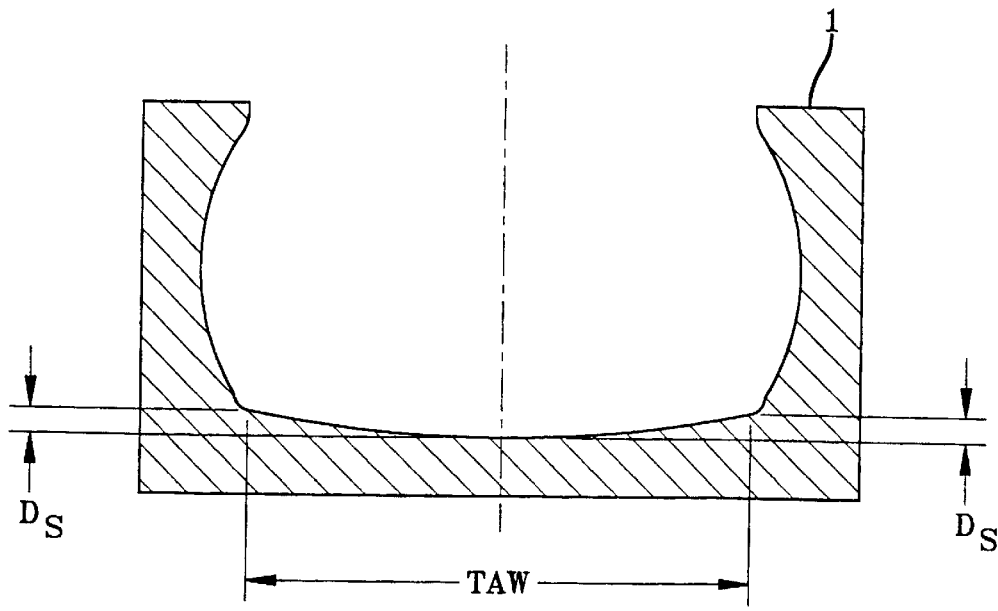
FIG. 1 is illustrative of a conventional prior art mold for a race tire.

FIG. 1 illustrates a conventional prior art tire mold 1. The tread profile of a typical symmetric mold can be described by its tread arc width, T.A.W., and by the relationship of tread width to the shoulder mold drop $D_s$. Shoulder mold drop $D_s$ is defined as the difference in diameters at the mold's centerline, the minimum radial mold height and its extreme shoulder, the maximum radial mold height along the tread profile. The minimum radial mold height at the mold centerline corresponds to the maximum radial height of the formed tire; while the maximum radial mold height at the extreme shoulders corresponds to the minimum radial height at the extreme shoulders of the formed tire. The maximum and minimum radial heights are relative to the outermost mold surface as represented in FIG. 1.

Figure 2:
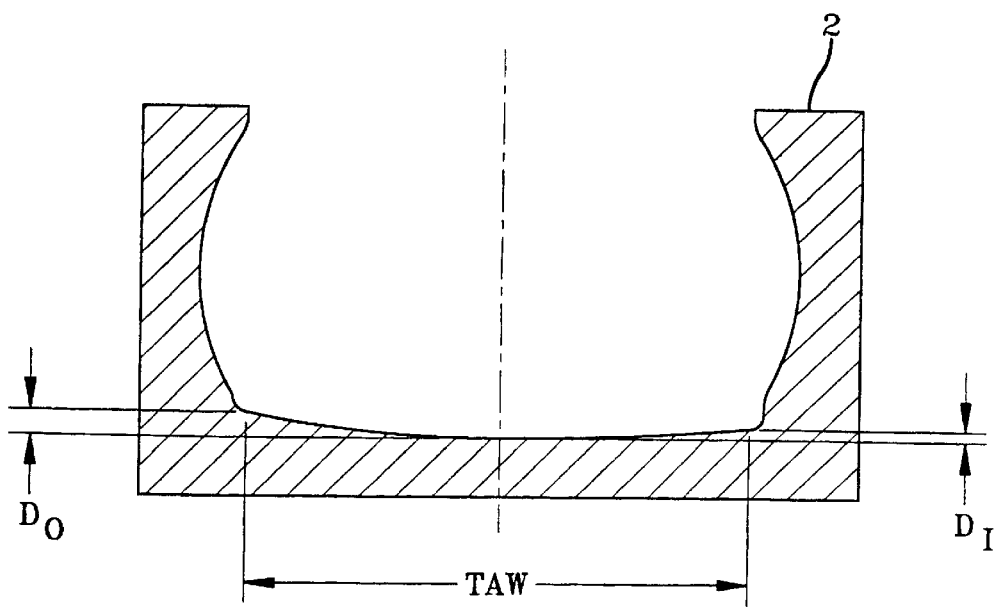
FIG. 2 is illustrative of a tire mold in accordance with the disclosed invention.

FIG. 2 illustrates a tire mold 2 in accordance with the disclosed invention. The mold tread profile, relative to the circumferential centerline, is asymmetric. Each shoulder region of the tread profile is defined by a shoulder drop equal to the height difference between the maximum radial mold height at the shoulder region and the minimum radial mold height at the tread profile centerline. A first shoulder region has a shoulder mold drop $D_o$, greater than the shoulder mold drop $D_1$ of the second opposing shoulder drop. The tire inserted in the mold is a tire at any stage of cure. The tire is built in accordance with conventional tire building methods. The tire may be of a symmetrical configuration, or may be of an asymmetrical build by variations in the bead structure, sidewall structure, or sidewall height. As with the conventional tire, herein, the minimum radial mold height at the mold centerline corresponds to the maximum radial height of the formed tire; while the maximum radial mold height at the extreme shoulders corresponds to the minimum radial height at the extreme shoulders of the formed tire. The maximum and minimum radial heights are relative to the outermost mold surface as represented in FIG. 1.

Figure 3:
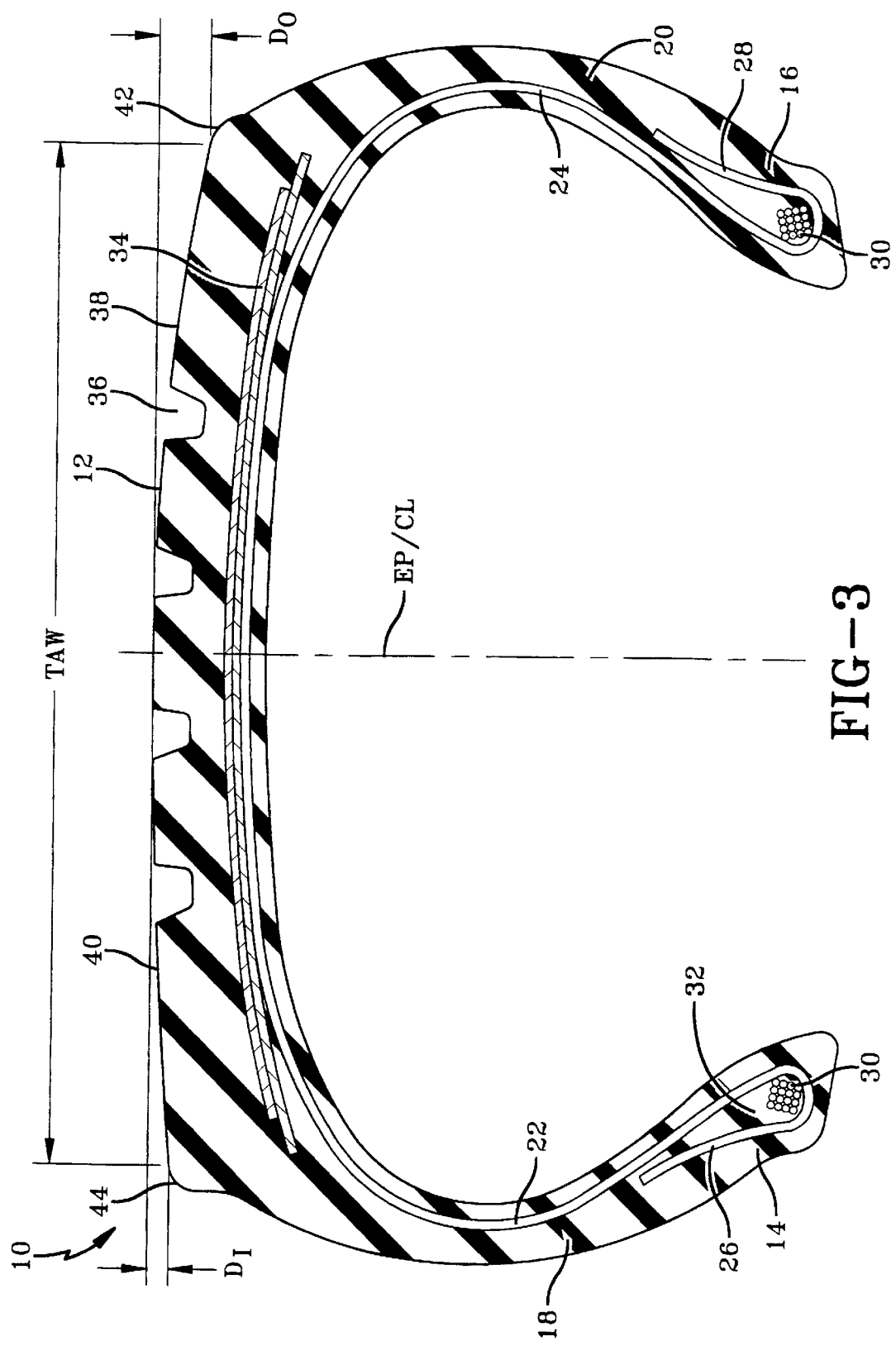
FIG. 3 is illustrative of a tire molded in accordance with the disclosed invention.

FIG. 3 illustrates a tire in accordance with the disclosed invention. The tire 10 is a low aspect ratio tire. Prior to insertion in the mold 2, the tire structure, excluding any preformation of a tread pattern, is symmetrical. The tire 10 has a tread portion 12, bead portions 14, 16 and sidewall portions 18, 20. The right and left sidewall portions 18, 20 are joined to the right and left bead portions 14, 16 respectively, and extend in the radially outward direction of the tire. The tread portion 12 extends in the circumferential direction of the tire and is provided between the left and right sidewalls 18, 20.

The tire 10 is provided with a carcass layer 22 comprising at least one layer of reinforcing cords. The carcass layer 22 has a main portion 24 extending from one bead portion 14 to the opposing bead portion 16, passing below the tread 12, and two end portions 26, 28. Each end portion 26, 28 is folded around each annular bead core 30 provided in each bead portion 14, 16 of the tire 10, and extending a radial distance into each sidewall portion 18, 20. The bead cores 30 may be formed in any known conventional configuration.

Radially outward of each bead core 30, and within the main carcass portion 24 and folded end portion 26, 28 of the carcass are bead fillers 32. The bead fillers 32 extend radially outward toward the sidewall portions 18, 20 of the tire 10. The bead fillers 32 have an approximately triangular configuration, tapering in width from the bead cores 30 toward the sidewalls 18, 20.

Radially outward of the carcass layer 22 and extending circumferentially about the tire 10 are a plurality of belt layers 34. The belt layers 34 are comprised of elastomeric embedded reinforcing cords arranged inclined with respect to the circumferential direction of the tire 10.

The tread 12 may be provided with circumferentially or laterally extending grooves 36, sipes, and slots, or the tread may be a slick with a lack of any grooving on the tread surface. The tread features are dependent upon the racing conditions, as known to those of skill in the art. Slicks are preferable for dry racing conditions, while grooved tires are preferable for wet track racing. In racing, any grooving of the tread may also be determined by the appropriate sanctioning bodies.

In the asymmetrical-drop mold design of the present invention, the shoulder drop $D_s$ differs on opposing shoulders. The axially outer shoulder 42 has a greater shoulder drop $D_o$ than the opposing shoulder 44. The ratio of the shoulder drop $D_o$ of the axially outer shoulder 42 relative to the shoulder drop $D_I$ of the axially inner shoulder 44 is within the range of 1.0 to 4.5. Preferably the ratio of the axially outer shoulder drop $D_o$ to the axially inner shoulder drop $D_I$ is 1.5 to 2.5. This is accomplished by either increasing the outer shoulder drop $D_o$ to be greater than the conventional drop $D_s$, or decreasing the inner shoulder drop $D_I$ to be less than the conventional drop $D_s$. The difference in shoulder drop is chosen to optimize tire footprint for a given set of load and camber conditions.

By the greater drop of the axially outer shoulder 42, the axially inner tread half 40 has a flatter tread profile than the opposing tread half 38 with more drop. The radii of curvature defining the axially outer tread half 38 are smaller than the radii of curvature defining the axially inner tread half 40.

Figure 4:
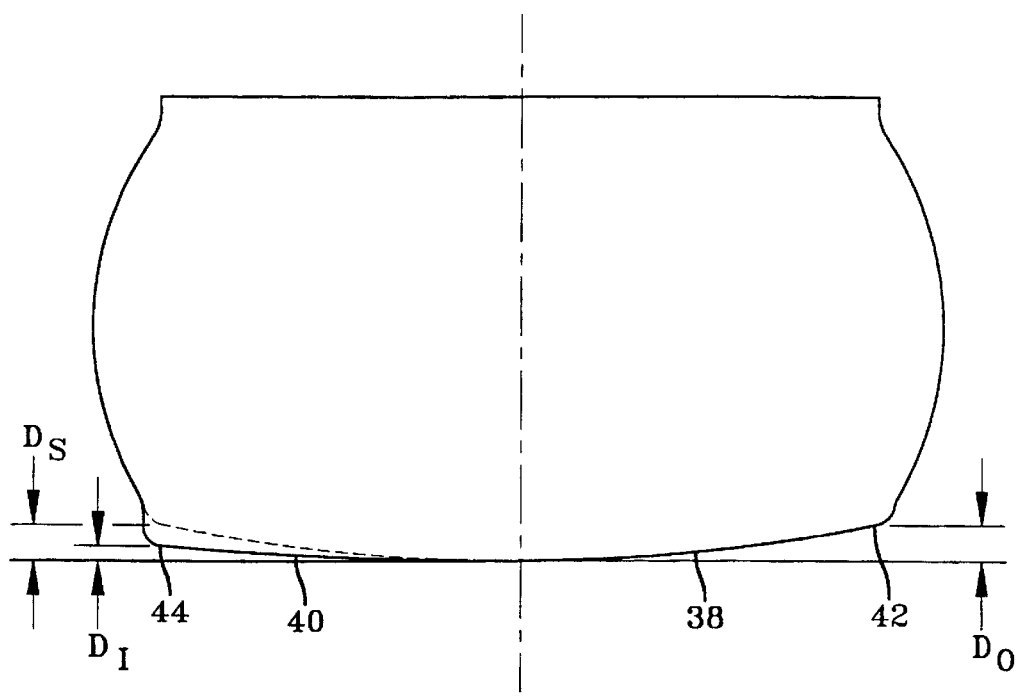
FIG. 4 is a comparison of the relationship between the conventional tire, the inventive tire, and the road surface during cornering of the tire.

FIG. 4 illustrates the difference in drop for the inventive tire in comparison to a conventional tire. The conventional tire profile is represented by the broken line, while the solid profile is that of the inventive tire. During cornering of the vehicle, cornering forces rolls the tire to the outside of the turn. These cornering forces, when operating in an off-camber condition, the outer shoulder 44 runs closer to the ground, or with higher load if touching the ground. By using less molded drop $D_I$ on the inner shoulder 44 the contact patch area is increased. Greater off-camber conditions will be required to lift the inner shoulder 44 of the asymmetrically molded tire 10 off the road surface.

In combination with the differing molded shoulder drops, the tread width, molded bead width, section width, and maximum section width height can also be varied on the mold's opposite sides, in accordance with known conventional techniques.

The asymmetric-drop mold will provide increased cornering capability on the rear of solid rear axle cars, such as NASCAR vehicles. These cars have little or no static negative camber to offset the effects of roll and lateral deflection. For oval track racers, which always turn to the left, the low drop half of the tires should be mounted on the left, as viewed from above, for both rear tires.

The disclosed mold configuration is also applicable for road racing cars which have no adjustable camber in the rear axle. For such races, wherein the cars turn both left and right, the low drop half should be mounted towards the car's centerline for both rear tires to gain the asymmetric advantage on the inside shoulder of the outside tire for a given turn.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of mounting a pair of tires 10 on a rear axle of a racing vehicle for running on an oval race course, wherein the method comprises providing a pair of tires 10 wherein a profile of an outer tread region 38 of a tread portion 12 of each tire 10 which is positioned to be further axially outward toward an outer side of a race course than a centerline CL of each tire 10 and a profile of an inner tread region 40 of the tread portion 12 of each tire 10 which is positioned to be further axially inward toward an inner side of the race course than the centerline CL of the tire 10 are asymmetrical, the method characterized by:

mounting each tire 10 on the rear axle of the vehicle such that the axially outer portion 38 of the asymmetrical tread region 12 of each tire 10, relative to the race course, has a greater shoulder drop $D_o$, wherein the shoulder drop is the difference between the maximum radial diameter of the tread 12 measured on the outer tread contour and the diameter of the tread at the tread edge 42,44, than the shoulder drop $D_I$ of the axially inner portion 40 of the asymmetrical tread region 12.

2. The method of mounting a pair of tires 10 in accordance with claim 1, wherein the ratio of the axially outer shoulder drop $D_o$ to the axially inner shoulder drop $D_I$ is in the range of 1.0 to 4.5.

3. The method of mounting a pair of tires 10 in accordance with claim 2 wherein the ratio of the axially outer shoulder drop $D_o$ to the axially inner shoulder drop $D_I$ is in the range of 1.5 to 2.5.

* * * * *